United States Patent
Dahari et al.

(10) Patent No.: US 12,271,355 B2
(45) Date of Patent: Apr. 8, 2025

(54) SEMANTIC CLASSIFICATION FOR DATA MANAGEMENT

(71) Applicant: BMC Software, Inc., Houston, TX (US)

(72) Inventors: Eyal Dahari, Ganei Tikva (IL); Michal Barak, Petach Tikva (IL)

(73) Assignee: BMC Software, Inc., Houston, TX (US)

( * ) Notice: Subject to any disclaimer, the term of this patent is extended or adjusted under 35 U.S.C. 154(b) by 291 days.

(21) Appl. No.: 17/937,261

(22) Filed: Sep. 30, 2022

(65) Prior Publication Data

US 2024/0111736 A1 Apr. 4, 2024

(51) Int. Cl.
| | | |
|---|---|---|
| G06F 16/00 | (2019.01) | |
| G06F 16/21 | (2019.01) | |
| G06F 16/215 | (2019.01) | |
| G06F 40/30 | (2020.01) | |

(52) U.S. Cl.
CPC .......... *G06F 16/215* (2019.01); *G06F 16/211* (2019.01); *G06F 40/30* (2020.01)

(58) Field of Classification Search
None
See application file for complete search history.

(56) References Cited

U.S. PATENT DOCUMENTS

2021/0263900 A1* 8/2021 Joyce .................. G06F 16/285

OTHER PUBLICATIONS

Wang, "Method, Device and Service System for Marking Data", CN-111061742-A, Apr. 24, 2020, 11 pages. (Year: 2020).*
Chen et al., "Method and Device for Processing Data", CN-102279843-A, Dec. 14, 2011, 15 pages. (Year: 2011).*
A. Guntupalli: "Power BI, Power BI Training Guide, Strategic Plan and Dashboard," available online at <https://files.nc.gov/ncosbm/PowerBI_Dashboards_TrainingManual.pdf>, Dec. 14, 2019, 29 pages.
D. Taylor: "DataStage Tutorial for Beginners: IBM DataStage (ETL Tool) Training," available online at <https://www.guru99.com/datastage-tutorial.html>, Aug. 27, 2022, 34 pages.
DataFlair: "Power BI Tutorial—A Complete Guide on Introduction to Power BI," available online at <https://data-flair.training/blogs/power-bi-tutorial/>, Jul. 15, 2018, 8 pages.
Informatica, "Informatica Power Center 10.2, Getting Started," Jun. 18, 2020, 125 pages.

(Continued)

*Primary Examiner* — Bai D Vu
(74) *Attorney, Agent, or Firm* — Brake Hughes Bellermann LLP

(57) ABSTRACT

Described systems and techniques enable fast and accurate semantic classification of data. Such semantic classification may be performed efficiently, e.g., in a manner that uses a minimal required set of resources to perform a given semantic classification. Moreover, described techniques dynamically improve over time, so that even when more resource-intensive operations are initially required to semantically classify data in a first iteration, similar data will be recognized more quickly and using fewer resources in later iterations.

20 Claims, 11 Drawing Sheets

(56) References Cited

OTHER PUBLICATIONS

K. Anbarasan: "SQL Server Integration Services (SSIS)—Step by Step Tutorial," available online at <http://roman.ptak.staff.iiar.pwr.wroc.pl/HDiBD/free-ebook-sql-server-integration-services-ssis-step-by-step-version-2-0.pdf>, Sep. 5, 2011, 431 pages.

M. Rahman: "Tableau, Tutorial for Beginners," available online at <https://cdn2.hubspot.net/hubfs/125873/External_Resource/tableau-tutorial-for-beginners.pdf>, May 9, 2015, 15 pages.

Oracle, "Oracle FMW, Oracle Data Integrator Quick Reference Guide," available online at ,https://docs.oracle.com/en/middleware/fusion-middleware/data-integrator/12.2.1.3/using/oracle-data-integrator-quick-reference-guide.pdf>, Feb. 2019, 48 pages.

Oracle, "Oracle Fusion Middleware, Getting Started with Oracle Data Integrator 12c," available online at <https://www.oracle.com/technetwork/middleware/data-integrator/overview/odi-12c-getting-started-guide-2032250.pdf>, Oct. 2015, 97 pages.

Tableau, "Tutorials point, Simply Easy Learning," available online at <https://www.tutorialspoint.com/tableau/tableau_tutorial.pdf>, 2016, 17 pages.

Teradata, "Teradata Database, Introduction to Teradata, Release 16.00, B035-1091-160K," available online at <https://assets.teradata.com/pdf/TCPP/database/Intro_to_Teradata_16_00.pdf>, Dec. 2016, 158 pages.

Trifacta, "User Guide, version 5.0.1," Jul. 20, 2018, 328 pages.

\* cited by examiner

SEMANTIC CLASSIFICATION FOR DATA MANAGEMENT

TECHNICAL FIELD

This description relates to data management.

BACKGROUND

Quantities of data required to be managed for use by businesses and other entities are extremely large and growing extremely quickly. For example, businesses may track customer data that is constantly increasing as new customers are added. Moreover, customer data may include far more information than basic identifying information such as a customer's name and address. For example, customer data may include detailed transaction data, which may continually grow over time as customers conduct additional transactions.

Additionally, a business or other entity may receive data from an external source, which may classify or organize the data differently than the receiving business/entity. Further, data may be merged, updated, or otherwise processed over time and/or as the data is used for various purposes, and such processing may also compound difficulties in classifying, understanding, and using the data.

Due to the above and related factors, it is difficult or impossible for conventional systems to recognize, classify, and use data for intended purposes. In many cases, data is processed manually in an attempt to overcome shortcomings of conventional systems, but manual processing is typically slow, expensive, and prone to error.

Consequently, it may not be possible to use available data effectively. As a result, businesses and other entities may miss opportunities, make incorrect or uninformed decisions, or otherwise operate in a wasteful or inefficient manner with respect to available data.

SUMMARY

According to some general aspects, a computer program product may be tangibly embodied on a non-transitory computer-readable storage medium and may include instructions. When executed by at least one computing device, the instructions may be configured to cause the at least one computing device to receive data having a plurality of field names, each field name associated with a plurality of field values, and access a semantic dictionary that associates each semantic type of a plurality of semantic types with a field value pattern and at least one known field name. When executed by at least one computing device, the instructions may be configured to cause the at least one computing device to relate, for a selected field name of the plurality of field names, corresponding field values to each field value pattern of the semantic dictionary to determine whether the corresponding field values match any field value pattern of the semantic dictionary, and generate, when the corresponding field values do not match any field value pattern of the semantic dictionary, a candidate field value pattern based on a candidate field value of the corresponding field values. When executed by at least one computing device, the instructions may be configured to cause the at least one computing device to determine that a threshold subset of the corresponding field values conform to the candidate field value pattern, and update the semantic dictionary with a new semantic type that is associated with the candidate field value pattern and the selected field name.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
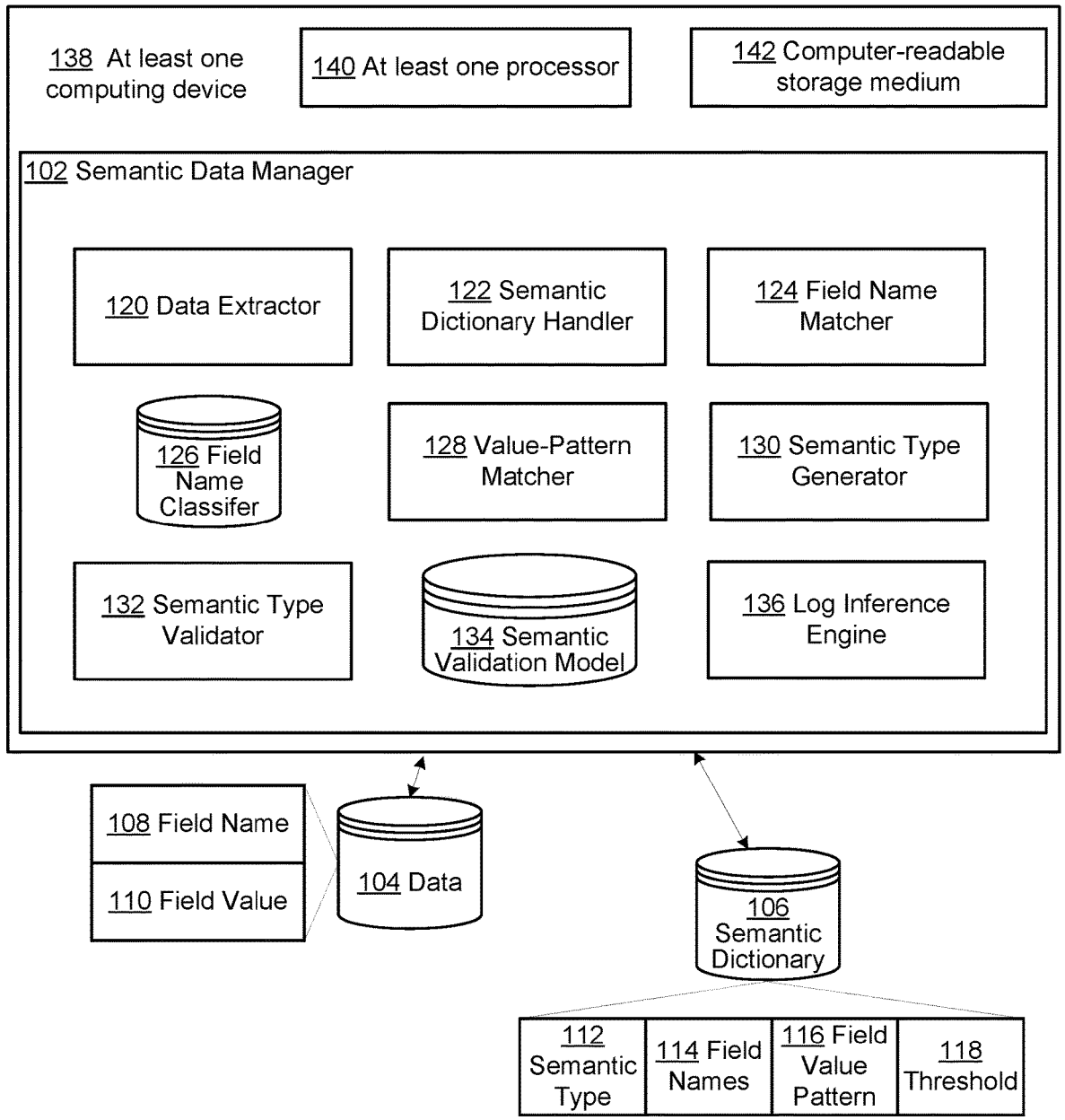
FIG. 1 is a block diagram of a system for semantic classification for data management.

Described systems and techniques enable, for example, fast and accurate semantic classification of data. Such semantic classification may be performed efficiently, e.g., in a manner that uses a minimal required set of resources to perform a given semantic classification. Moreover, described techniques dynamically improve over time, so that even when more resource-intensive operations are initially required to semantically classify data in a first iteration, similar data will be recognized more quickly and using fewer resources in later iterations.

Described techniques may be used effectively even when data being processed is imported from an external source and/or contains errors (e.g., is mis-labelled, or contains typographical errors) due to earlier processing (e.g., manual processing). In other examples, described techniques may accurately track and classify data over time and through multiple data processing events (e.g., data merges, data splits, or data updates), which may be referred to herein as data lineage.

In more specific examples, described techniques may assist data teams and operations teams in detecting data lineage issues such as, but not limited to, data duplication, data classification, and/or data reconciliation, to thereby enable faster data exploration and discovery. By addressing these and related issues, it is possible, for example, to increase an organization's operational efficiency, reduce lengthy processes of root cause analysis, build data validation rules, and otherwise automate and scale data management.

At least the following benefits and advantages may therefore be obtained. For example, field data formats may be extracted, and automatic field annotation for hierarchical semantic types may be performed. Data exploration time may be minimized, and automatic insights on data for data quality, data governance, data compliance, and data security may be provided. Trust in the data, and decision-making based on the data, may be improved across multiple contexts (e.g., data management silos may be reduced).

In more detail, described techniques use field-level matching based on semantic data classification that uses generated regular expressions to accurately and dynamically classify semantic data types. Field data pattern extraction and unsupervised machine learning (ML) based matching enables data classification using both field names and field values (as compared, for example, to conventional solutions that may use only field names or field values).

Described solutions enable construction of a data dictionary of semantic classifications, thereby learning new semantic data types and extending existing data types in an automatic manner. Previously unseen data types may nonetheless be used to dynamically extend the semantic data dictionary.

Also advantageously, domain expertise is not required to initiate and operate the techniques described herein. Instead, multiple types of data from multiple domains may be successfully processed, including, for example, commerce, finance, or healthcare. Similarly, described techniques are effective across multiple types of vendors/systems/datasets (e.g., tabular, semi-structured, or Javascript Object Notation (JSON) datasets).

As described in detail, below, methodologies may include a multi-step (e.g., five step or five stage) process that progresses from simpler to more complex techniques for identifying and validating semantic data classifications. Consequently, described techniques are faster than existing methods, and will stop early in the process once a given semantic type is detected with a sufficiently high level of confidence. Moreover, as referenced above and described in more detail, below, the multi-step process of semantic data classification grows faster over time, since data types that initially require more intensive processing will be processed with earlier, faster steps during later processing.

FIG. 1 is a block diagram of a system for semantic classification for data management. In the example of FIG. 1, a semantic data manager 102 processes data 104 in conjunction with a semantic dictionary 106. The semantic data manager 102 is configured to dynamically update, generate, or otherwise modify the semantic dictionary 106 to ensure that the data 104 is classified correctly, and to thereby enable accurate interpretation of the data 104 across any future use case scenarios. Consequently, the data 104 may be used for its intended purpose(s), even when the data 104 originally has missing, unknown, or incorrect semantic classifications.

As illustrated in FIG. 1, the data 104 may include a field name 108 that characterizes a corresponding plurality of field values, shown for simplicity in FIG. 1 as a field value 110. For example, in a database table, the field name 108 may represent a column name, and the field value 110 may represent a row value, or a plurality of row values. More generally, the field name 108 may represent any designation or characterization associated with the field value 110, regardless of a format, notation, structure, or application that is used to store the data 104.

As also illustrated in FIG. 1, the semantic dictionary 106, which may also be structured as a table with columns and rows, or using any other suitable format, may include a semantic type 112 associated with one or more corresponding field names 114. For example, the semantic type 112 may represent a category of information that may be included within the data 104, or other data. As illustrated and described in various examples below, when the data 104 relates to a person(s), e.g., customers, the semantic type 112 may include a name, address, social security number, phone number, or other identifying characteristics of a person. When the data 104 relates to information technology (IT) assets, the semantic type 112 may include hardware type (e.g., server, laptop, or desktop computer), asset physical location, or asset network address.

Of course, the semantic type(s) 112 suitable for a particular type or collection of the data 104 will vary, based on the data 104 itself. In some cases, the semantic type 112 may be defined by a user. In other cases, as described below, the semantic data manager 102 may be configured to analyze the data 104 and generate a new semantic type for inclusion in the semantic dictionary 106.

The field names 114 of the semantic dictionary 106 correspond to the field name(s) 108 of the data 104. The field name 108 may be provided by a user or generated by an underlying application, and will often be expressed as an abbreviation, acronym, or other shortened format.

In some cases, the field name 108 may refer to a well-known concept or category. For example, in the examples above, the field name 108 may include ADDR or ADRS to refer to an address, or may include SSN or Soc. Sec. to refer to a social security number. In other examples, the field name 108 may refer to a highly-specialized context. For example, in an IT context, the field name 108 may include an abbreviation for a specific type of hardware that may not be known to others who are outside of the IT organization.

The semantic type 112, that is, each instance of the semantic type 112 within the semantic dictionary 106, may have a one-to-one or one-to-many relationship with the field names 114, i.e., with corresponding instances of the field names 114. For example, in the examples above, a semantic type of 'address' may have field names 114 of ADDR and ADRS, or the semantic type of 'social security number' may have field names 114 of SSN or Soc. Sec.

Similarly to the relationship between the field name 108 and the field names 114, a field value pattern 116 of the semantic dictionary 106 corresponds to the field value 110 of the data 104. As described in detail, below, the field value pattern 116 refers to an expected sequence, order, and/or number of characters and/or character type(s) that are expected within the field value 110.

For example, a field value pattern for the field name of SSN (or Soc. Sec.) for the semantic type of 'social security number' may have a field value pattern of xxx-xx-xxxx, where 'x' indicates a variable representing a number from 0-9, so that the field value pattern 116 in this example may be understood to represent a sequence of numbers, each from 0-9, in which three numbers are separated by a dash or hyphen from two numbers, which are separated by a dash or hyphen from four numbers.

Each instance of the semantic type 112 may have a one-to-one or one-to-many relationship with an instance of the field value pattern 116. Each instance of the field names 114 may have a one-to-one, one-to-many, or many-to-many relationship with an instance of the field value pattern 116.

For example, a semantic type of 'address' may have multiple field value patterns. For example, a field value pattern for 'address' may include "xx aaaaaaaaa St./Rd./Blvd., aaaaaaaaaaa, aa xxxxx," in which 'x' designates numbers from 0-9 and 'a' represents letters from A-Z. Further, the/indicates optional inclusion of one of the included possible designators of St. for street, Rd. for road, or Blvd. for Boulevard. In this example, the field value pattern may be defined so that an included number of x's for numbers or a's for letters indicate a maximum or exact number of numbers/letters included within a corresponding part of the field value pattern. Thus, "aa" indicates a two-letter designator for a U.S. state, and 'xxxxx' indicates a 5 number designator for a zip code.

Many different types of characters and associated techniques for defining the field value pattern 116 may be used, some of which are provided below. For example, variables may be used to indicate whether a particular character or type of character may or must be included (i.e., is necessary or optional), and/or indicators may be used to determine whether a minimum, maximum, or exact number of (type of) character(s) is/are required within a particular field value pattern.

A threshold 118 represents and characterizes a level or extent of conformance between the field value pattern 116 and corresponding field value(s) 110, individually and/or in the aggregate. For example, the threshold 118 may be expressed as a percentage of field values 110 that conform to the field value pattern 116.

For example, when the field name 108 is 'social security number' and the field value 110 is 123-45-6789, then there is an exact match with a field value pattern 116 of xxx-xx-xxxx. When the data 104 includes a large plurality of field values 110, e.g., includes social security numbers for a large number of persons, then the threshold 118 may characterize an extent to which each of the plurality of social security numbers conform to the field value pattern 116 in the aggregate. For example, if the data includes 100 persons and their social security numbers, with 99 having the expected field value pattern but having one person with a field value of '123-45-678,' then the pattern conformance level may be characterized as 99%.

In the example of a social security number, with a highly regular and simple field value pattern, the threshold 118 may be set very high, e.g., 100%, indicating that a corresponding pattern conformance level must be exact in order to relate the field value(s) 110 with a semantic type of 'social security number.' In other examples, such as the example above of a physical address as described above, there may be more variations in field value(s) 110, and more variability in the corresponding field value pattern 116. Consequently, a value of the threshold 118 may be lower (e.g., 80%) to relate the field value(s) 110 with a semantic type of 'address.'

Additional examples and explanation are provided below with respect to the data 104 and the semantic dictionary 106. For purposes of FIG. 1, it may be appreciated that the data 104 may be received from many different sources and in many different contexts. The semantic dictionary 106 may initially be substantially empty, sparsely filled, or may include many existing semantic definitions. In these and various other scenarios, the semantic data manager 102 may be configured to populate, update, or otherwise manage content of the semantic dictionary 106, so that the data 104 may be correctly interpreted, parsed, or otherwise used.

For example, the data 104 may include common types of data (such as the examples above of customer data or IT asset data), but may include unknown abbreviations for the field name(s) 108. In other examples, the data 104 may include less common or unknown data. In still other examples, the data 104 may include data that has previously been processed multiple times and/or includes two or more merged datasets, as illustrated and described below with respect to FIG. 3.

In any of the above scenarios, and related scenarios, the semantic data manager 102 may be configured to manage the semantic dictionary 106 in a manner that identifies semantic types in the data 104 and relates corresponding field names to the identified semantic types. In some cases, the semantic dictionary 106 may include an instance of the semantic type 112 and the semantic data manager 102 may recognize and relate a previously unrelated instance of the field name 108 to the existing semantic type instance. In other examples, the semantic data manager 102 may generate an entirely new semantic type instance, and may associate one or more instances of the field name 108 within the field names 114 corresponding to the new semantic type instance.

In example implementations, the semantic data manager 102 may include a data extractor 120 that is configured to extract the data 104. The semantic data manager 102 may also include a semantic dictionary handler 122 that is configured to input existing content of the semantic dictionary 106 and to update the semantic dictionary 106 with any new content generated or otherwise provided by the semantic data manager 102.

In order to provide new content for the semantic dictionary 106, the semantic data manager 102 may execute a multi-step process. The multi-step process is illustrated and described in the example of FIG. 1 primarily as a five step process, but a different number of steps may be used, as illustrated and described in various examples, e.g., with respect to FIG. 2.

In the example of FIG. 1, a first step of a five step process may be executed using a field name matcher 124, a field name classifier 126, and a value-pattern matcher 128. For example, the field name matcher 124 may be configured to compare the field name 108 with each instance of the field names 114, to determine whether a match exists. Similarly, the value-pattern matcher 128 may be configured to compare the field value 110 with a corresponding instance(s) of the field value pattern 116, to determine whether a match exists.

For example, if the field name 108 has a value of ADDR and an instance of the field name 114 includes ADDR, then a match exists and may indicate that the field name corresponds to a semantic type 112 of Address. Similarly, if the corresponding field value pattern 116 matches the field value 110 in accordance with the pre-determined threshold 118, then the value-pattern matcher 128 may determine that a match exists.

For example, if the threshold 118 is 80% for the semantic type Address, and the field value 110 represents 100 instances of addresses stored in the data 104, the value-pattern matcher 128 may compare each of the 100 address instances to the corresponding instance of the field value pattern 116. If 80 of the 100 address instances match the field value pattern 116, then the value-pattern matcher 128 may determine that a match exists.

If both the field name 108 and the field value 110 match a corresponding semantic type 112 of the semantic dictionary 106 (i.e., match at least one of a corresponding field name(s) 114 and its corresponding field value pattern 116 and threshold 118), then the semantic data manager 102 may stop processing the field name 108 and move to a subsequent field name of the data 104. In this way, the semantic data manager 102 may quickly identify portions of the data 104 that are correctly classified in accordance with the semantic dictionary 106.

In some cases, the field name 108 may correspond to an instance of the field names 114, without being an exact match. For example, the field name 108 may include a misspelling or other typographical error of an intended field name. In other examples, the field name 108 may include a slight variation on an existing one of the field names 114.

In such cases, a field name classifier 126 may represent an unsupervised machine learning model that has been trained to assign a similarity score between the field name 108 and each of the field names 114 (or an identified subset thereof). If the similarity score is sufficiently high, e.g., above a threshold, then the field name 108 may be considered to be a match by the field name matcher 124 even if an exact match does not exist. In such cases, the value-pattern matcher 128 may operate as described above, to determine whether the field name 108 and the field value 110 match an existing instance of the semantic type 112. Additional example details of the field name classifier 126 are described below, e.g., with respect to semantic validation model 134, and with respect to FIGS. 5, 7, and 10.

If the combined operations of the field name matcher 124, field name classifier 126, and the value-pattern matcher 128 do not result in recognition of a semantic type 112 during a first stage of operations of the semantic data manager 102, then the value-pattern matcher 128 may be configured to execute a second stage of operations of the semantic data manager 102. For example, the value-pattern matcher 128 may extract the field value(s) 110 and compare them to the field value pattern(s) 116.

Each field value pattern that matches a set of field values 110 in conformance with a corresponding threshold 118 may be tracked and marked as a potential match with respect to corresponding ones of the semantic type 112. That is, a plurality of candidate semantic types may be identified as corresponding to the field value pattern being tested. Then, the candidate semantic types may be sorted based on a number or percentage of matches between the field value(s) 110 and the field value pattern 116 being tested. The candidate semantic type with the best match may then be identified as the correct semantic type.

If no correct semantic type can be identified by the value-pattern matcher 128, then a semantic type generator 130 may be configured to generate a new semantic type for inclusion in the semantic dictionary 106. As described in detail herein, the semantic type generator 130 may be configured to generate an entire new row of a table of the semantic dictionary 106, e.g., may generate new instances of the semantic type 112, the field name(s) 114, the field value pattern 116, and the threshold 118.

For example, the semantic type generator 130 may identify an unrecognized instance of the field name 108 (e.g., a field name instance that has failed operations of the field name matcher 124, the field name classifier 126, and the value-pattern matcher 128). The semantic type generator 130 may populate the new row of the semantic dictionary 106 with the previously-unrecognized field name instance as an instance of the semantic type 112 and of the field names 114.

Then, the semantic type generator 130 may populate the corresponding field value pattern 116 with a newly-identified or generated field value pattern that corresponds to the field values 110 of the field name 108 for which the new semantic type is being generated. For example, the semantic type generator 130 may select a first existing instance of the field value 110, such as the first field value, or a random field value. Then, the semantic type generator 130 may extract a pattern from the selected field value, and identify a number and/or percentage of remaining field values that match the extracted pattern.

If less than one hundred percent (or some other designated threshold percentage) of the field values match the extracted pattern, then the above process may be repeated with a second field value. For example, of the remaining field values, a first remaining field value or a random remaining field value may be identified, and a second pattern may be extracted.

If less than one hundred percent (or some other designated threshold percentage) of the field values match either the first extracted pattern or the second extracted pattern, then the process may be repeated until the designated threshold is met. Once the threshold is met, then the corresponding extracted patterns may each be added to the field value pattern 116 for the newly-generated semantic type (e.g., to the newly-generated row of the semantic dictionary 106).

Thus, the semantic type generator 130 may generate multiple new semantic types (rows) of the semantic dictionary 106, each populated with corresponding values of the semantic type 112, the field name(s) 114, the field value pattern 116, and the threshold 118. However, since the semantic type generator 130 operates based on preceding failures of the field name matcher 124 and the value-pattern matcher 128 to identify an existing semantic type, it may occur that existing semantic types may already be included within the semantic dictionary 106, but which were not previously correctly captured or identified.

In such cases, the semantic type generator 130 may add a new row to the semantic dictionary 106 that is not needed, e.g., that is redundant to an existing row of the semantic dictionary 106. To avoid these and other undesired outcomes, a semantic type validator 132 may use a trained semantic validation model 134 to determine whether each new semantic type generated by the semantic type generator 130 should be retained, or should be combined with an existing semantic type.

For example, the semantic validation model may represent a trained, unsupervised machine learning model that uses clustering to assign similarity scores between a candidate semantic type and existing semantic types within the semantic dictionary 106. The semantic validation model 134 may be trained using the semantic dictionary 106, and possibly with other sources of existing semantic data or classifications that may exist within an organization.

Since the semantic validation model 134 is trained using the semantic dictionary 106, the semantic validation model 134 may be updated and/or re-trained as needed, based on earlier operations of the field name matcher 124 and the value-pattern matcher 128. However, such training may be time-consuming, expensive, or otherwise resource intensive, particularly when frequent updates are needed. By performing such training only on candidate semantic types generated by the semantic type generator 130, rather than on all possible (e.g., otherwise unrecognized) semantic types, the semantic data manager 102 may operate quickly and efficiently to dynamically update and maintain the semantic dictionary 106 for use in processing the data 104 and future data that may be processed.

Figure 3:
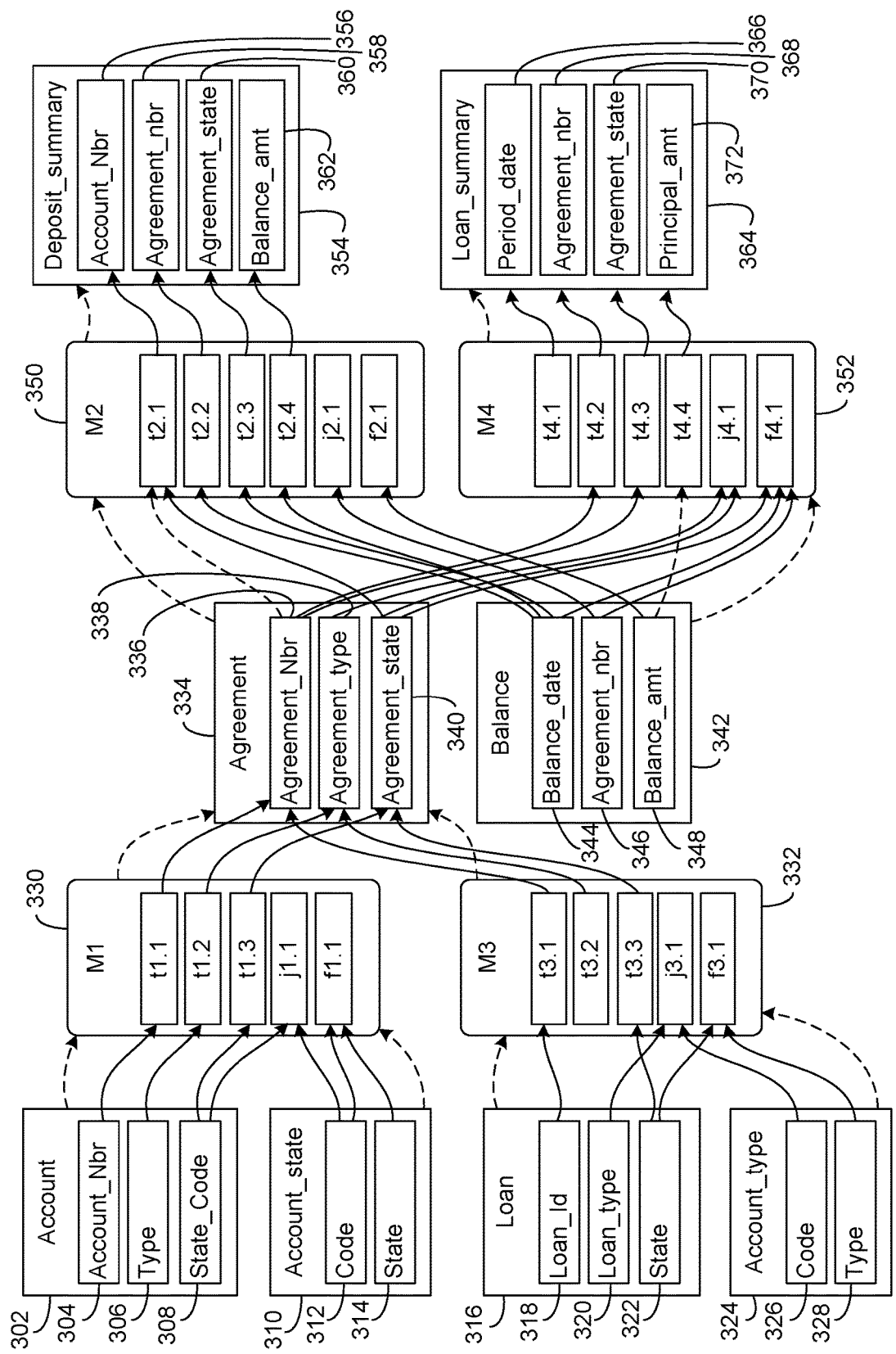
FIG. 3 is a data flow diagram illustrating an example data lineage that may be used by the system of FIG. 1.

For additional validation and efficient management of the semantic dictionary 106, a log inference engine 136 may be configured to process each new semantic type generated by the semantic type generator 130 and validated by the semantic type validator 132, using available data logs (not shown separately in FIG. 1, but illustrated by way of more detailed example with respect to FIG. 3).

For example, the log inference engine 136 may be configured to example data logs and associated operations performed on stored data to determine whether the same, similar, or related data stored in conjunction with two or more field names should actually be associated with a single semantic type. For example, a first dataset may be stored in conjunction with a first field name (e.g., customer ID) and a second dataset may be stored in conjunction with a second field name (e.g., ID). If a merge or join query relates these two datasets, e.g., for purposes of satisfying the query, then the log inference engine 136 may infer that both datasets are of a single semantic type. This inferred information may then be used to validate the single semantic type and associated field names within the semantic dictionary 106. Of course, other inference techniques may be used as well, some examples of which are provided below, e.g., with respect to FIGS. 3 and 11.

In the simplified example of FIG. 1, the semantic data manager 102 is illustrated as being executed using at least one computing device 138, which is illustrated as including at least one processor 140 and a non-transitory computer-readable storage medium 142. It will be appreciated that the at least one computing device 138 may represent multiple computing devices in communication with one another. In some examples, the at least one computing device 138 may represent a server, a workstation, a cloud-based virtual machine, or a mainframe computing device.

In FIG. 1, the semantic data manager 102 is illustrated as including the various separate component or modules 120-136. In various other examples, however, two or more of the separate component or modules 120-136 may be combined, or, conversely, may have their functions divided for separate implementation(s).

Figure 2:
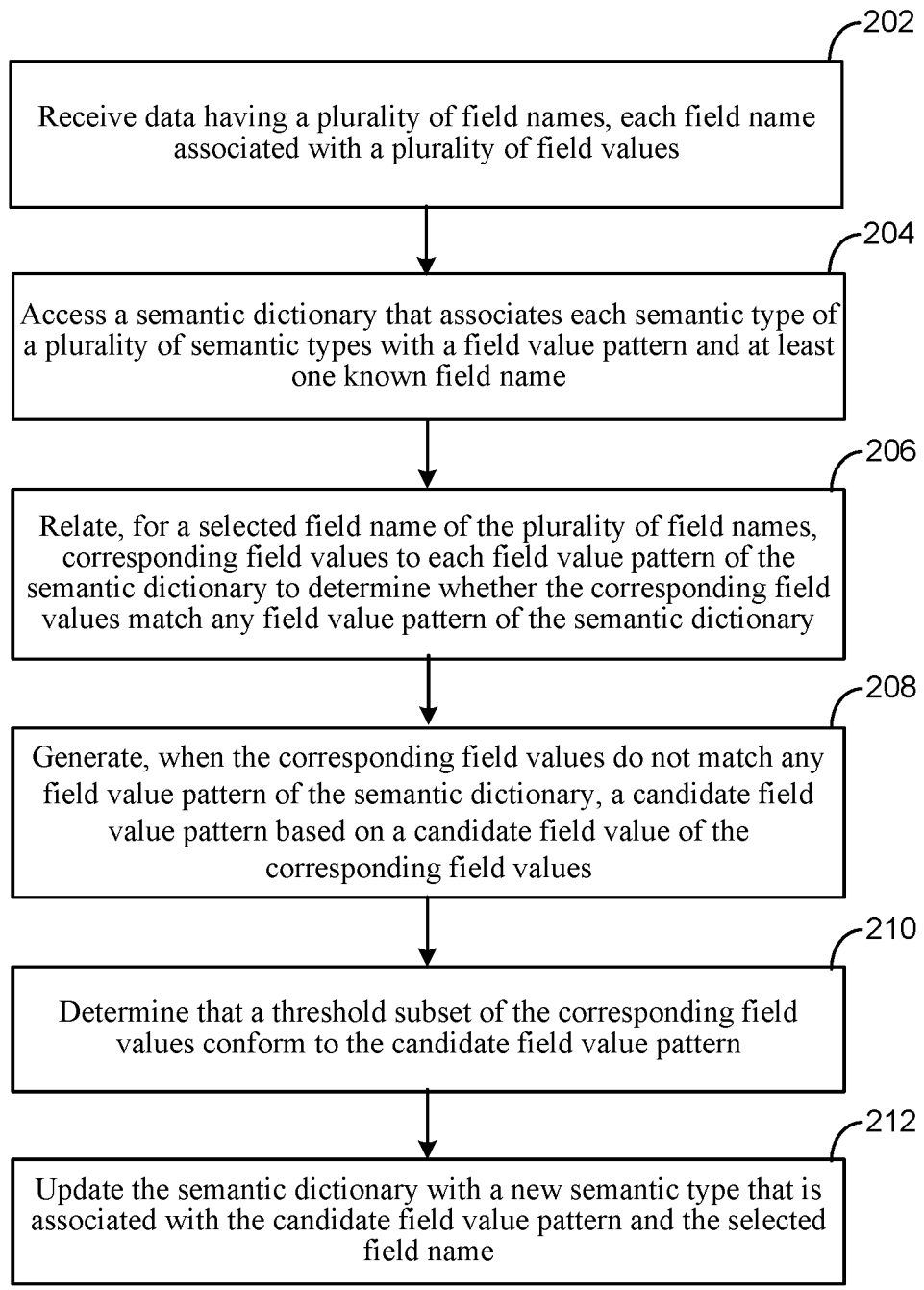
FIG. 2 is a flowchart illustrating example operations of the system of FIG. 1.

FIG. 2 is a flowchart illustrating example operations of the system of FIG. 1. In the example of FIG. 2, operations 202-312 are illustrated as separate, sequential operations. In various implementations, the operations 202-212 may include sub-operations, may be performed in a different order, may include alternative or additional operations, or may omit one or more operations. Further, in all such implementations, included operations may be performed in an iterative, looped, nested, or branched fashion.

In the example of FIG. 2, data having a plurality of field names may be received, each field name associated with a plurality of field values (202). For example, the data extractor 120 may be configured to extract a column(s) of data from the data 104, including the field name 108 and associated field value(s) 110.

A semantic dictionary may be accessed that associates each semantic type of a plurality of semantic types with a field value pattern and at least one known field name (204). For example, the semantic dictionary handler 122 may be configured to access the semantic dictionary 106, which, as discussed in detail above, may include various values for semantic type 112, each with associated values for field names 114 and field value patterns 116, as well as associated thresholds.

For a selected field name of the plurality of field names, corresponding field values may be related to each field value pattern of the semantic dictionary to determine whether the corresponding field values match any field value pattern of the semantic dictionary (206). For example, the value-pattern matcher 128 may be configured to compare each instance of the field value pattern 116 with the field value(s) 110 of the data 104. As described above, such a comparison may be made, for example, following (or in conjunction with) a failed attempt by the field name matcher 124 to match the field name 108 with one of the field names 114.

When the corresponding field values do not match any field value pattern of the semantic dictionary, a candidate field value pattern may be generated based on a candidate field value of the corresponding field values (208). For example, the semantic type generator 130 may extract a candidate field value pattern by identifying an instance of the field value 110 (e.g., a first row/instance, or a random row/instance), and then determining the candidate field value pattern from the identified instance of the field value 110. As described above, if the corresponding field values do match a field value pattern 116, then the field name(s) of the corresponding field values may be matched to the semantic type 112 of the matched field value pattern 116.

A threshold subset of the corresponding field values may be determined to conform to the candidate field value pattern (210). For example, the semantic type generator 130 may determine that a pre-determined percentage of the subset of the corresponding field values conform to the candidate field value pattern. In other examples, as described, a second candidate field value pattern may be extracted from a second field value, and a second subset of field values may be determined to conform to the second candidate field value pattern. In such examples, the combination of the first and second candidate field value patterns may be compared to the threshold.

The semantic dictionary may be updated with a new semantic type that is associated with the candidate field value pattern and the selected field name (212). For example, the semantic type generator 130 may update the semantic dictionary 106 with a row in which the new semantic type is included in association with a corresponding field name and with the candidate field value pattern(s). For example, the field name may be included as a duplicate of the field name being examined, and as a name of the new semantic type, and the new field value patterns may include as many of the candidate field value patterns as previously determined to be needed to ensure that the represented field values satisfy the pre-determined threshold. As also described above, and in more detail, below, the new semantic type may be validated by one or both of the semantic type validator 132 and/or the log inference engine 136.

FIG. 3 is a data flow diagram illustrating an example data lineage that may be used by the system of FIG. 1. For example, FIG. 3 may illustrate that such data lineages introduce complexities and difficulties in understanding the semantic context(s) of data over time and over the course of multiple data manipulations, even if the semantic context is initially understood. Nonetheless, FIG. 3 also illustrates that when data lineage is captured in a data logging context, the techniques of FIGS. 1 and 2 enable use of such data logs for the purposes of validating the semantic context(s) discovered by such techniques.

In more detail, FIG. 3 illustrates an example related to the processing of a loan for a customer who has an existing account, so as to generate a loan agreement for the customer and the loan, and to deposit the proceeds of the loan. As FIG. 3 is intended merely to provide a high-level illustration of an example context in which the techniques of FIGS. 1 and 2 may be used, specific details regarding the data processing of FIG. 3 are not provided herein.

In general, FIG. 3 illustrates an account table 302 that includes a field 304 for an account number, with a field name Account_Nbr. The account table 302 includes a field 306 for an account type, with a field name Type. The account table 302 includes a field 308 for an account state, with a field name State_Code.

An account state table 310 includes a field 312 for an account state code, with a field name Code. The account state table 310 includes a field 314 for an account state, with a field name State.

A loan table 316 includes a field 318 for a loan identifier, with a field name Loan_Id. The loan table 316 includes a field 320 for a loan type, with a field name Loan_type. The loan table 316 includes a field 322 for a loan state, with a field name State.

An account type table 324 includes a field 324 for an account type code, with a field name Code. The account type table 324 includes a field 328 for an account type, with a field name Type.

Various data manipulations may be performed on the tables 302, 310, 316, 324, as illustrated by data manipulations 330 and data manipulations 332. For example, data manipulations may include a merge, a join, a copy, or an aggregation.

In the example of FIG. 3, various fields of the tables 302, 310, 316, and 324 are processed to populate an agreement table 334. As shown, the agreement table 334 includes a field 336 for an agreement number, with a field name Agreement_Nbr. The agreement table 334 includes a field 338 for an agreement type, with a field name Agreement_type. The agreement table 334 includes a field 340 for an agreement state, with a field name Agreement_state.

Meanwhile, a balance table 342 includes a field 344 for a balance date, with a field name Balance date. The balance table 342 includes a field 346 for an agreement number, with a field name Agreement_nbr. The balance table 342 includes a field 348 for balance_amount, with a field name Balance_amt.

As shown, the agreement table 334 and the balance table 342 may thus be used in further data manipulations 350 and 352 to populate a deposit summary table 354 and a loan summary table 364. The deposit summary table 354 includes a field 356 for an account number, with a field name Account_Nbr. The deposit summary table 354 includes a field 358 for an agreement number, with a field name Agreement_nbr. The deposit summary table 354 includes a field 360 for an agreement state, with a field name Agreement_state. The deposit summary table 354 includes a field 362 for a balance amount, with a field name Balance_amt.

The loan summary table 364 includes a field 366 for a period date, with a field name Period_date. The loan summary table 364 includes a field 368 for an agreement number, with a field name Agreement_nbr. The loan summary table 364 includes a field 370 for an agreement state, with a field name Agreement_state. The loan summary table 364 includes a field 372 for a principal amount, with a field name Principal_amt.

Thus, FIG. 3 illustrates that it is difficult to maintain semantic context across multiple transactions and operations. For example, in FIG. 3, the name 'state' refers to a current context or condition, as compared, for example, to a state in the United States. The field 308 refers to a code for an account state, and contains the same data as the field 312. However, the field 312 and the field 326 both have a field name of Code, but refer respectively to an account state code and an account type code.

With respect to the log inference engine 136 of FIG. 1, FIG. 3 illustrates that if the data lineage of FIG. 3 is logged, then the log inference engine 136 may be used to validate conclusions of the semantic data manager 102 in a fast and efficient manner. For example, if the semantic type generator 130 generates a semantic type 112 of 'State' with field names 114 of State-Code, State, and Agreement_state, then the log inference engine 136 may validate these conclusions by comparing corresponding field values in conjunction with any intervening data manipulations.

In particular, the log inference engine 136 need not validate all such field values and data manipulations across all of the data lineage of FIG. 3, which may be slow and resource intensive. Instead, the log inference engine 136 only needs to validate the specific results of the semantic type generator 130, so that the validations are targeted and efficient.

Figure 4:
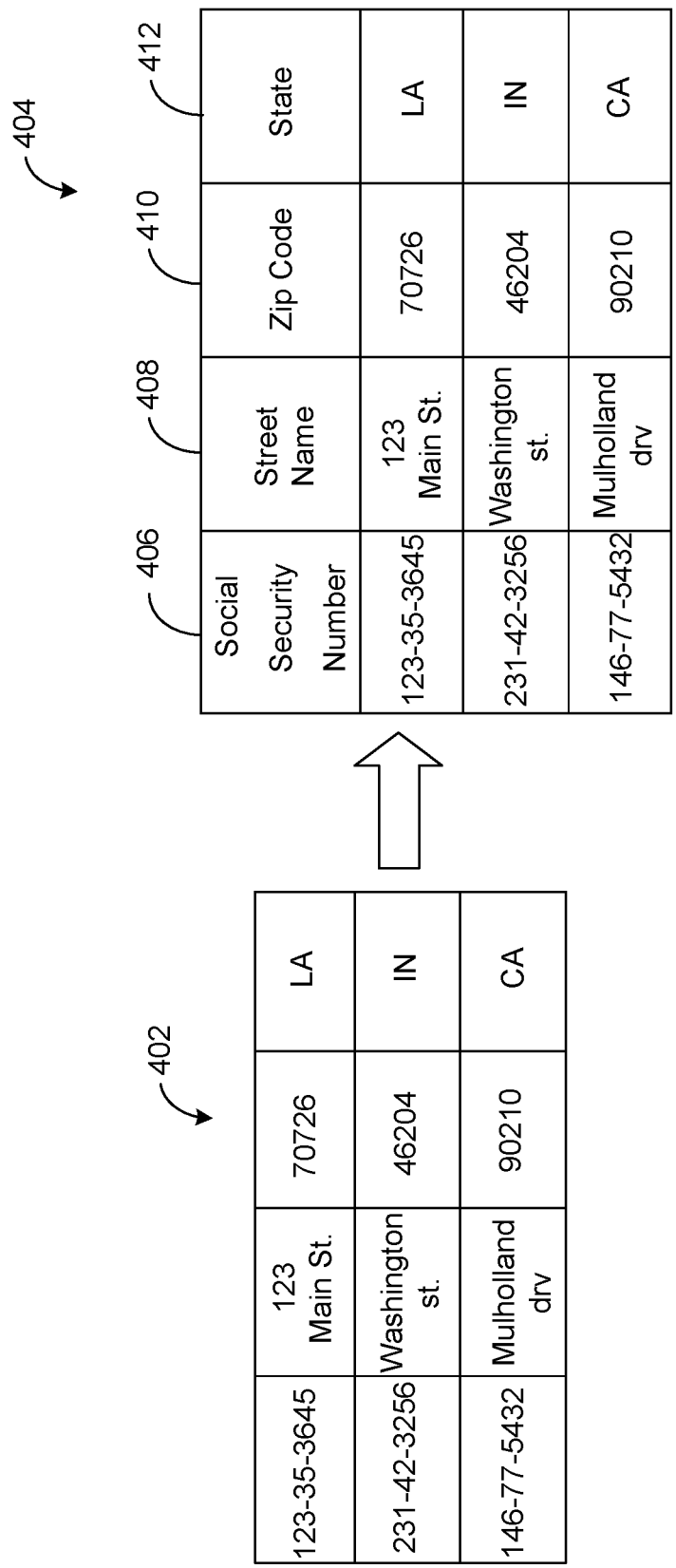
FIG. 4 illustrates a conversion of a table of unknown semantic type to a table with known semantic types.

FIG. 4 illustrates a conversion of a table 402 of unknown semantic type to a table 404 with known semantic types. FIG. 4 is a simplified example intended to show a function of the semantic data manager 102.

As shown, the table 404 includes a column 406 to which a field name and semantic type of 'social security number' has been added.

Similarly, the table 404 includes a column 408 to which a field name and semantic type of 'street name' has been added. The table 404 also includes a column 410 to which a field name and semantic type of 'zip code' has been added, and a column 412 to which a field name and semantic type of 'State' has been added.

Figure 5:
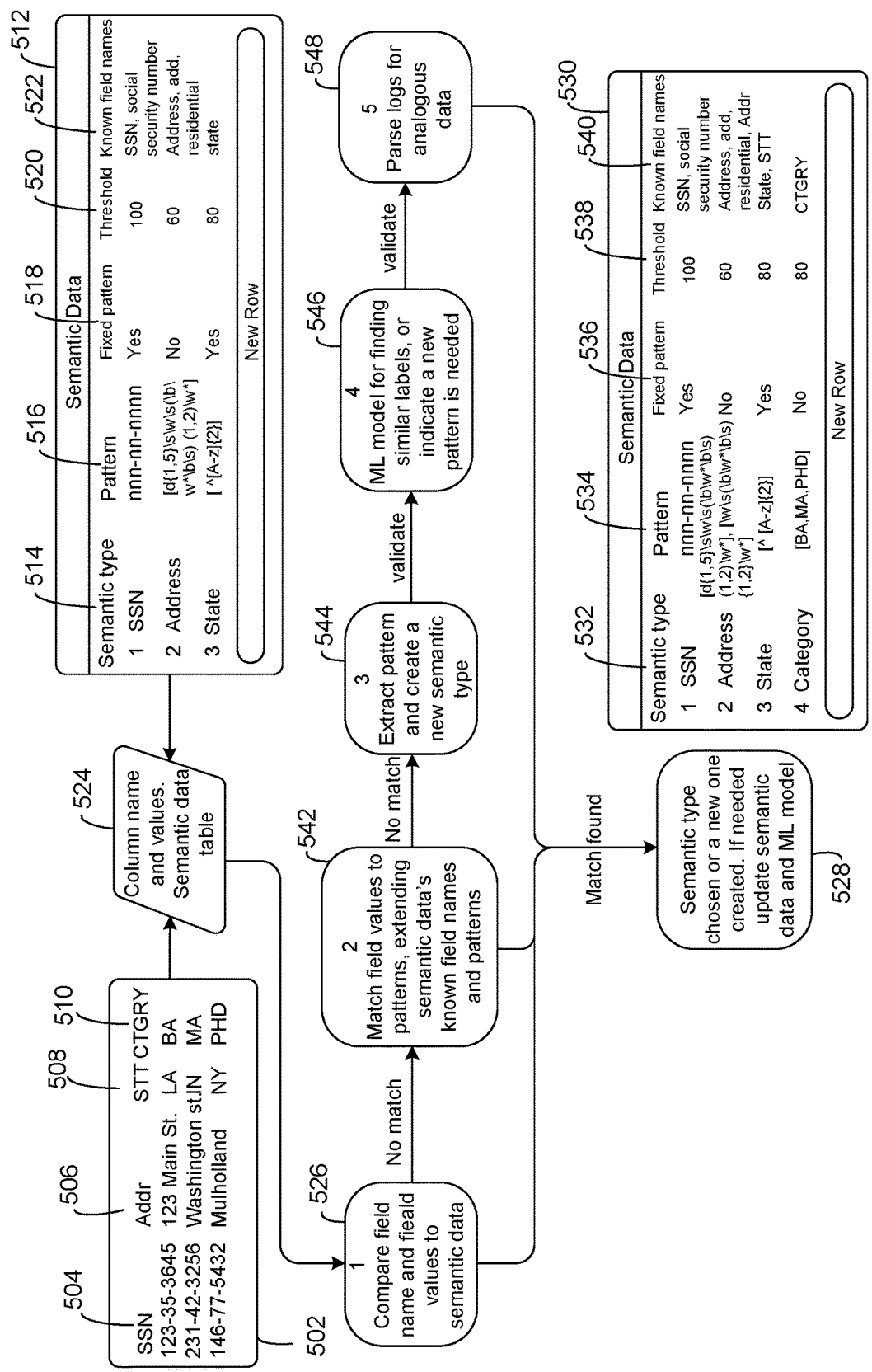
FIG. 5 is a flowchart illustrating more detailed example operations of the system of FIG. 1.

FIG. 5 is a flowchart illustrating more detailed example operations of the system of FIG. 1. In the example of FIG. 5, a table 502 is analogous to the data 104 of FIG. 1. As shown, the table 502 includes a column 504 with a field name of 'SSN' for Social Security number, a column 506 with a field name of 'Addr' for address, a field name of 'ST' for state, and a column 510 with a field name of 'CTGRY' for category.

Further in FIG. 5, a semantic data table 512 illustrates an example of the semantic dictionary 106 of FIG. 1. As shown, the semantic data table 512 includes columns for semantic type 514, pattern 516, fixed pattern 518, threshold 520, and known field names 522. As may be appreciated from the above description of FIG. 1, the semantic type 514 is analogous to the semantic type 112 FIG. 1, and the known field names 522 are analogous to the field names 114 of FIG. 1. Similarly, pattern 516 of FIG. 5 is analogous to the pattern 116 of FIG. 1, and the threshold 520 is analogous to the threshold 118 in FIG. 1. In FIG. 5, the column labeled fixed pattern 518 indicates whether a corresponding pattern 516 is fixed or variable (e.g., is or is not extendable, as described below).

In an operation 524, the names of the columns 504-510 are extracted from the table 502 (e.g., using the data extractor 120 of FIG. 1), and semantic data is extracted from columns 514-422 of the semantic data table 512 (e.g., using the semantic dictionary handler 122 of FIG. 1).

FIG. 5 illustrates that the techniques of FIGS. 1 and 2, as referenced above, may be implemented as a five stage process, shown in FIG. 5 as operations 526, 542, 544, 546, and 548. In the first stage of operation 526, each field name is compared to the known field names 522 of the semantic data table 512 (e.g., using the field name matcher 124 of FIG. 1). Similarly, each set of field values is compared to a corresponding pattern 516 (and its associated threshold 520) of the semantic data table 512 (e.g., using the value-pattern matcher 128 of FIG. 1).

If a field name is found and the corresponding field values are matched to the relevant pattern in excess of the corresponding threshold, then a match is determined to be found and a concluding operation 528 reflects that a corresponding semantic type 514 has been chosen. For example, from the column 504 of the table 502, the field name SSN may be matched to the known field name SSN in the column 522 of the semantic data table 512. In conjunction, the field values in the column 504 may be matched to the pattern value corresponding to the known field name, i.e., nnn-nn-nnnn. Since the field values in the column 504 match the pattern values in the column 516 to the required threshold value of 100% in the threshold column 520, a value-pattern match may be verified. Consequently, no further searching or other operations are required for the column 504 and its various values.

As noted above, the operation 526 may also use the field name classifier 126, in cases when there is not an exact match between a field name and known field names. For example, if the field name of the column 504 were "Soc. Sec. No." instead of SSN, the field name matcher 124 could use the field name classifier 126 to determine sufficient similarity to the known field names of SSN and 'social security number' to match the field name of the column 504 to the corresponding known field names.

In such cases, the known field names 522 may be updated within an updated semantic data table 530 with the similarity-matched field name, as part of the concluding operation 528. As shown, the updated semantic data table 530 includes the same columns as the semantic data table 512, labelled separately in FIG. 5 for clarity as semantic type 532, pattern 534, fixed pattern 536, threshold 538, and known fixed names 540.

If the operation 526 were to fail, however, operation 542 would proceed to attempt to match field values of a column/field being inspected to available patterns, e.g., using the value-pattern matcher 128 of FIG. 1. For example, each pattern 516 may be tested against field values being considered to find a best-available match. If the field values covered by a pattern being tested exceed the corresponding threshold of that pattern, then a match is considered to be found, and the concluding operation 528 may be executed.

In the operation 542, it is assumed that the relevant field name does not match the known field name(s) 522, because such a match would have been detected in the operation 526 by the field name matcher 124. Nonetheless, since the operation 542 verifies a match between a set of field values and a pattern value of the patterns 516, the operation 542 also effectively matches the field name of the set of field values to the pattern value, and thus to the corresponding semantic type value of the semantic type 514. As a result, whatever field name is associated with the set of field values may be added to known field names 522, to obtain the updated known field names 540 of the updated semantic data table 530, as shown in the operation 542.

Further, if the relevant threshold value of the threshold 520 is less than 100%, then it may occur that some of the field values being tested do not conform to the corresponding pattern. It is possible that isolated ones of these field values may contain typographical or other errors. It is also possible that the relevant field values include a secondary pattern that is valid with respect to the corresponding field name. In the latter case, as shown in the operation 542, the corresponding pattern may be extended to account for and include the secondary pattern. Techniques for extending the pattern may rely on, or be based on, techniques used in operation 544, as described in detail, below, with respect to FIGS. 8 and 9.

In a specific example, the column 506 may be processed. As may be observed from FIG. 5, the column 506 has a field name of Addr and field values related to residential addresses. The field name Addr is not in the known field names 522, so that (and assuming the field name classifier 126 is not successful in matching the field name Addr to known field names Address, add, residential) the operation 526 is assumed to fail in this example.

In executing the operation 542, the pattern value of the pattern 516 is assumed to match over 60% as the threshold value of the threshold 520 for all of the field values of the column 506. Consequently, the operation 542 succeeds in this example, and the updated semantic data table 530 includes the new field name Addr of the column 506. Moreover, the pattern value of the pattern 534 is extended from "[d{1,5} \s\w\s(\b\w*\b\s) (1,2)\w*]" to include "[\w\s (\b\w*\b\s) {1,2}\w*]," as shown in FIG. 5.

In another example of a successful implementation of the operation 542, the column 508 has a field name of STT (which is not in the known field names 522, so that the operation 526 will fail). In the operation 542, the pattern value of the pattern 516 is assumed to match over 80% as the threshold value of the threshold 520 for all of the field values of the column 508. Consequently, the operation 542 succeeds in this example, and the updated semantic data table 530 includes the new field name STT of the column 508. In this example, the pattern value of the pattern 534 is marked as fixed in the column 518, so the pattern value of the pattern 534 is not extended.

If neither the operation 526 or the operation 542 is successful, then no semantic type will have been determined with respect to the semantic data table 512. Then, the operation 544 (as implemented by the semantic type generator 130 of FIG. 1) may proceed to attempt to generate a new semantic type for inclusion in the updated semantic data table 530.

For example, for a column that fails both the operations 526, 542, such as the column 510, the operation 544 may extract a pattern using the field values of the column 510. For example, a sample field value may be chosen from the column being analyzed, such as a first or a random field value of the column.

Once a pattern is extracted from the sample field value, a percentage of field values matching the extracted pattern may be determined. If the percentage exceeds a pre-determined threshold, then the extracted pattern may be designated as a new pattern for the semantic type being generated.

If the percentage does not exceed a pre-determined threshold, then a second field value may be selected from among field values not covered by the first extracted pattern, for use in extracting a second pattern. If the combined percentage of field values does not exceed the pre-determined threshold, then a third sample field value may be selected, and the process may continue.

Once the combined percentage of field values exceeds the pre-determined threshold, then the extracted pattern(s) may be included with the new semantic type being generated. A field name for the new semantic type may also be included, e.g., as the field name of the column for which the process is being executed.

For example, the column 510 is illustrated as including a field name CTGRY, which does not match any of the known field names 522, so that the operation 526 fails. Similarly, the field values of the column 510 do not match any of the pattern values of the pattern column 516, so that the operation 542 also fails.

In the operation 544, the field value "BA" may be selected and used to form an extracted pattern, as just described Similar operations may be performed using one or more remaining field values MA and/or PHD, until a pre-determined threshold of field values matching the extracted patterns meets or exceeds 80%.

Then, the updated semantic data table 530 may be updated with a new semantic type 532, which is included in a new row with a semantic type shown as Category, with the extracted patterns (designated as variable) and relevant threshold included in appropriate columns. The known field names column 540 is updated with a field name, which is simply the field name include in the column 510.

Further in FIG. 5, the operation 546 executes to validate any new semantic types, such as the new semantic type Category just described. For example, the semantic type validator 132 may be configured to use the semantic validation model 134 to, e.g., compare the generated new semantic type against all existing semantic types of the updated semantic data table 530. As a result of such operations, it may occur that the generated new semantic type is actually sufficiently similar to an existing semantic type to be included with that existing semantic type.

The semantic validation model 134 may also be trained to determine whether a new pattern is needed. For example, if the semantic type validator 132 determines that the generated semantic type should be included with an existing semantic type, it may occur that the existing semantic type does not include a pattern that sufficiently matches the field values of the field/column for which the semantic type was generated. In other words, such a result may be relatively likely, because if the existing semantic type included a sufficiently similar pattern with respect to the field values being considered, then operation 542 would have been unlikely to fail, and the operation 544 would not have been required to generate a new semantic type.

For example, if the semantic data table 512 hypothetically included a semantic type of 'group,' the semantic type validator 132 may determine that the new semantic type of 'category' should be merged with the existing semantic type of 'group,' and a new known field name of CTGRY should be added to the known field names 522 for the semantic type 'group.'

Then, one or more patterns extracted during the operation 544 may be added to any pattern(s) already included in column 516 for the existing semantic type 'group.' Consequently, in the future, any data received with a field name of CTGRY will be likely to be recognized in either the operation 526 or the operation 542 as being included within the existing semantic type 'group.' In other words, the processes of FIG. 5 become more efficient over time, as the updated semantic data table 530 becomes more likely to recognize new and existing semantic types.

As referenced above, training and updating the semantic validation model 134 may be a time-consuming and resource-intensive process. For example, training data, e.g., field names and field values, may be obtained from global, domain-specific, or organization-specific sources, and may be voluminous.

Moreover, it may be necessary or desirable to re-train and update the semantic validation model 134 relatively frequently, e.g., to reflect the results of the operations 542 and 544. For example, the updated semantic data table 530 reflects the updated known field names 540, which include the added field names Addr and STT as described above, as well as the extended pattern of the Address semantic type, as well as the new semantic type Category and associated pattern and field name information.

All such information, and similar updates to the updated semantic data table 530, should be included when training the semantic validation model 134, in order to improve an accuracy of the semantic type validator 132 during future validation operations (e.g., the operation 546). Such updated training may be performed in a timely and efficient manner, because the training is not required to be performed globally and/or at each iteration/execution of the semantic data manager 102. Instead, the updated training is performed in a highly targeted manner, e.g., is performed only in response to generation of updated semantic data and/or in response to generation of a new semantic type by the semantic type generator 130.

Also in FIG. 5, data logs may be parsed for analogous data in operation 548. As described above with respect to the log inference engine 136 and the example data lineage of FIG. 3, various data logs may include relevant data in which the same or similar data fields as those being validated are inspected to determine connections therebetween. Then, if a connected field has a known field name or other attribute being inspected, it may be possible to infer that the field being validated also has the same field name/attribute. Accordingly, a semantic type may be validated in a timely and efficient manner.

Figure 6:
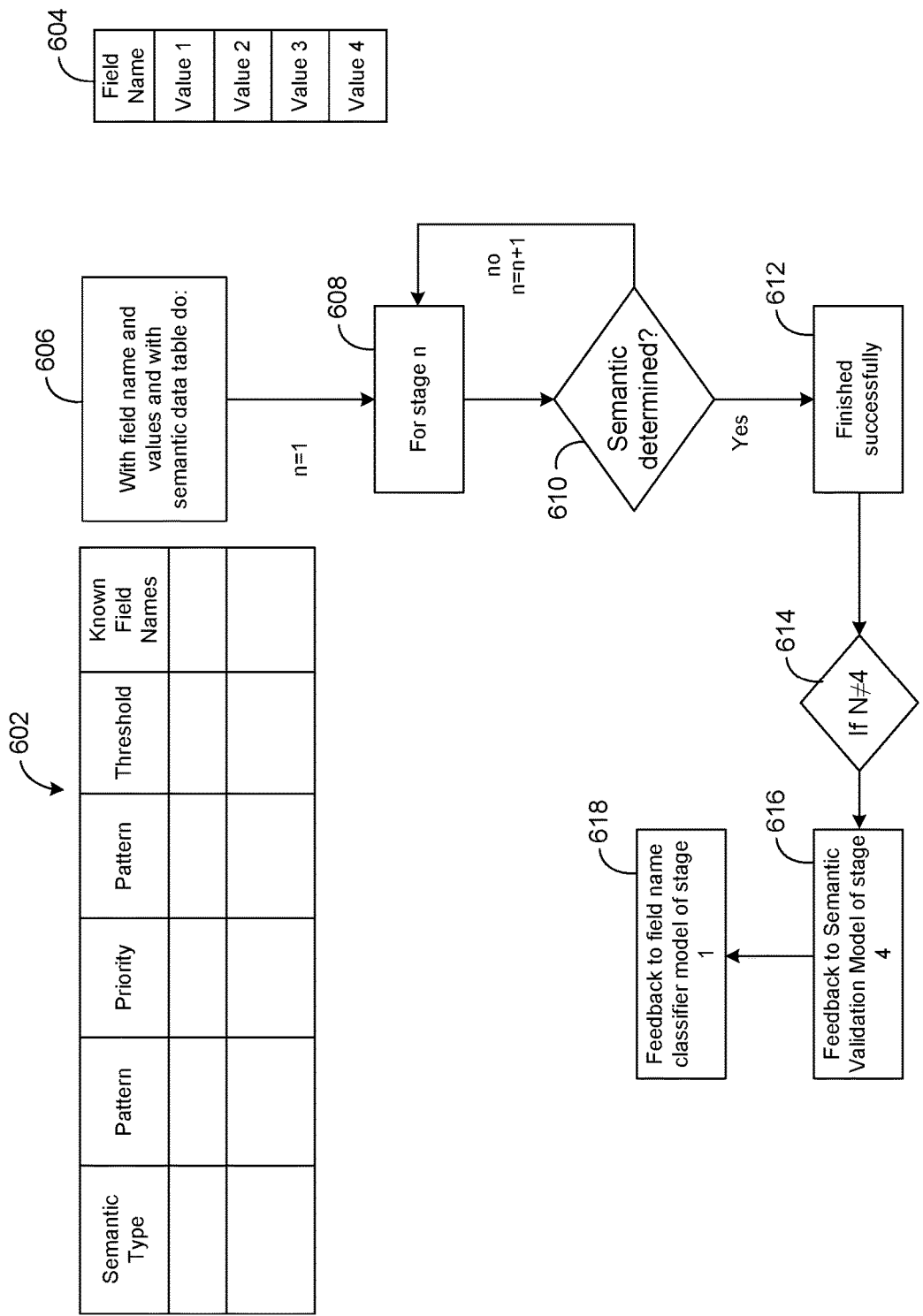
FIG. 6 is a flowchart illustrating a five stage process of the system of FIG. 1, as illustrated in more detail in FIGS. 7-11.

FIG. 6 is a flowchart illustrating a five stage process of the system of FIG. 1, as illustrated in more detail in FIGS. 7-11. In the example of FIG. 6, a semantic dictionary 602 provides an example of the semantic dictionary 106 of FIG. 1 and/or the semantic data table 512 of FIG. 5. The semantic dictionary 602 is illustrated as including the various fields already described, including a semantic type, pattern, pattern, threshold, and known field names. The semantic dictionary 602 also includes a priority field, which indicates relative priorities of semantic types. The priority, as described below, may be used, for example, to assist in matching patterns to field values.

Further in FIG. 6, a data table 604 provides an example of the data table 104 of FIG. 1 and/or the data table 502 of FIG. 5. As shown, the data table 604 includes at least one field name and various field values.

FIG. 6 illustrates that with extracted field name(s) and field value(s), and with semantic data from the semantic dictionary 602, a do loop may be initiated (602). At a first stage of n=1, e.g., a first stage corresponding to the operation 526 of FIG. 5 (608), the relevant semantic may or may not be determined (610) through matching a field name to known field names and matching field values to a known field value pattern.

If not found (610), the process continues to a second stage of n=2, e.g., a second stage corresponding to the operation 542 of FIG. 5 (608). At this stage, the relevant semantic may or may not be determined (610) through matching field values to a known field value pattern, based on a known threshold.

If not found (610), the process continues to a third stage of n=3, e.g., a third stage corresponding to the operation 544 of FIG. 5 (608). At this stage, the relevant semantic may or may not be determined (610) through generating a new semantic type and associated field name and pattern.

If validation is required so that the new semantic is not considered fully determined (610), the process continues to a fourth stage of n=4, e.g., a fourth stage corresponding to the operation 546 of FIG. 5 (608). At this stage, the semantic validation model 134 or similar trained machine learning model may be used to validate the generated semantic type or to merge the generated semantic type with an existing, sufficiently similar semantic type.

If further validation is required so that the new semantic is not considered fully determined (610), the process continues to a fifth stage of n=5, e.g., a fifth stage corresponding to the operation 548 of FIG. 5 (608). At this stage, available data logs may be parsed to find logged fields similar to the field name being validated, and to use connected fields (e.g., associated by a join or merge operation) that are connected to the logged fields to complete validation of the validated field and associated semantic type.

If the semantic type is successfully determined (610, 612), and not by stage 4 (614), then the process may additionally provide feedback regarding new patterns, field names, or semantic types to the semantic validation model 134 (616), to ensure that the semantic validation model 134 is trained using the most current and updated information available. Similarly, the process may additionally provide feedback regarding updated field name(s) and semantic type(s) to the field name classifier 126 (618), to ensure that the field name classifier 126 is trained using the most current and updated information available.

Figure 7:
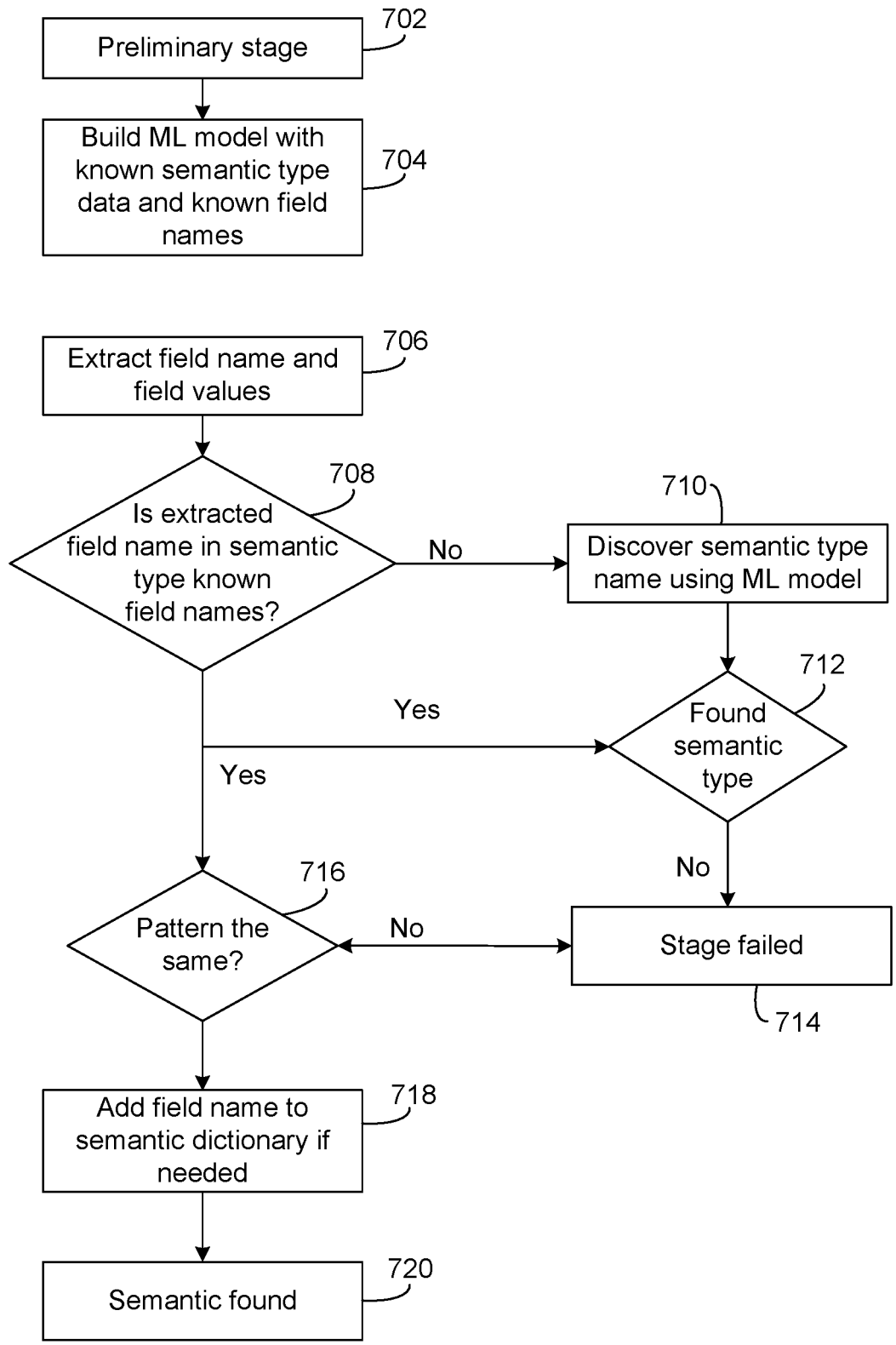
FIG. 7 is a flowchart illustrating a first stage of the five stage process of FIG. 6.

FIG. 7 is a flowchart illustrating a first stage of the five stage process of FIG. 6. In a preliminary stage (702) prior to processing beginning, an appropriate machine learning model is built using known semantic type data and known field names. For example, the field name classifier 126 may be trained.

Then, during processing (e.g., during the operation 526 of FIG. 5), a field name and associated field values may be extracted (706). If the extracted field name is included in the known field names of a semantic dictionary (708), or if the previously-trained ML model is used to discover a corresponding semantic type (710, 712), then the extracted field values may be compared to the corresponding pattern (716).

If any of the preceding operations (708, 710, 712, 716) fail, then the entire stage fails (714), and processing moves to a second stage as described herein and illustrated and described below with respect to FIG. 8. However, if the extracted field name corresponds to a known field name (either by match (708) or by discovered similarity (710, 712), and if the field values and field value pattern also match (716), then the semantic type may be determined to have been found (720). If the ML model was used, then the field name that was related to known field names by the similarity score of the ML model may be added to the semantic dictionary (718).

Figure 8:
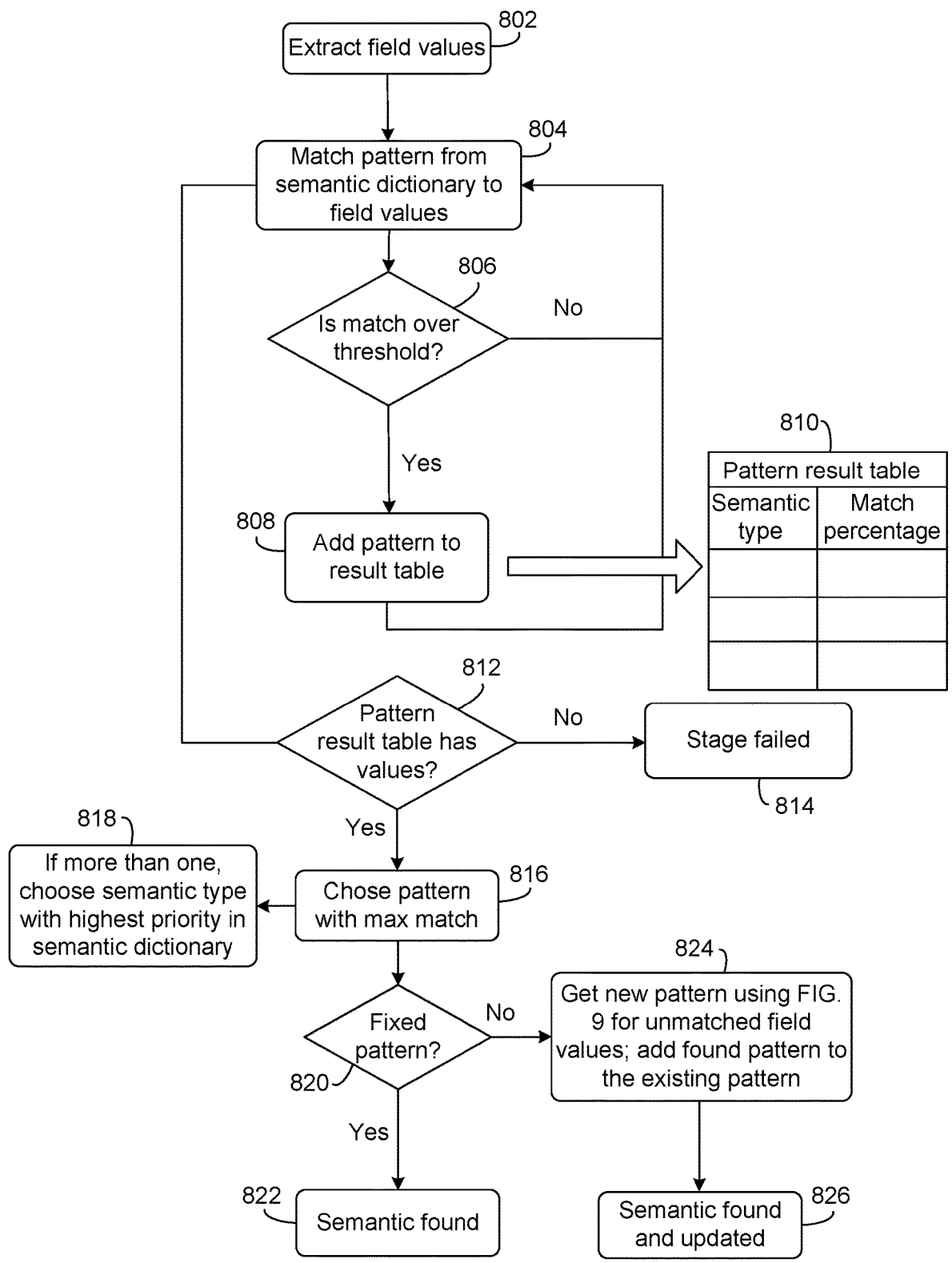
FIG. 8 is a flowchart illustrating a second stage of the five stage process of FIG. 6.

FIG. 8 is a flowchart illustrating a second stage of the five stage process of FIG. 6. In the process of FIG. 8, field values are extracted (802) from the data table 604, and a selected field value pattern from the semantic dictionary 602 is matched to the field values (804). If the percentage of matching field values is not over the relevant threshold (806), then the process may move to a next field value pattern (804).

If the match percentage meets or exceeds the threshold (806), then the pattern may be added to a pattern result table 810 (808). As shown, the pattern result table 810 lists a match percentage for each semantic type/pattern.

Figure 9:
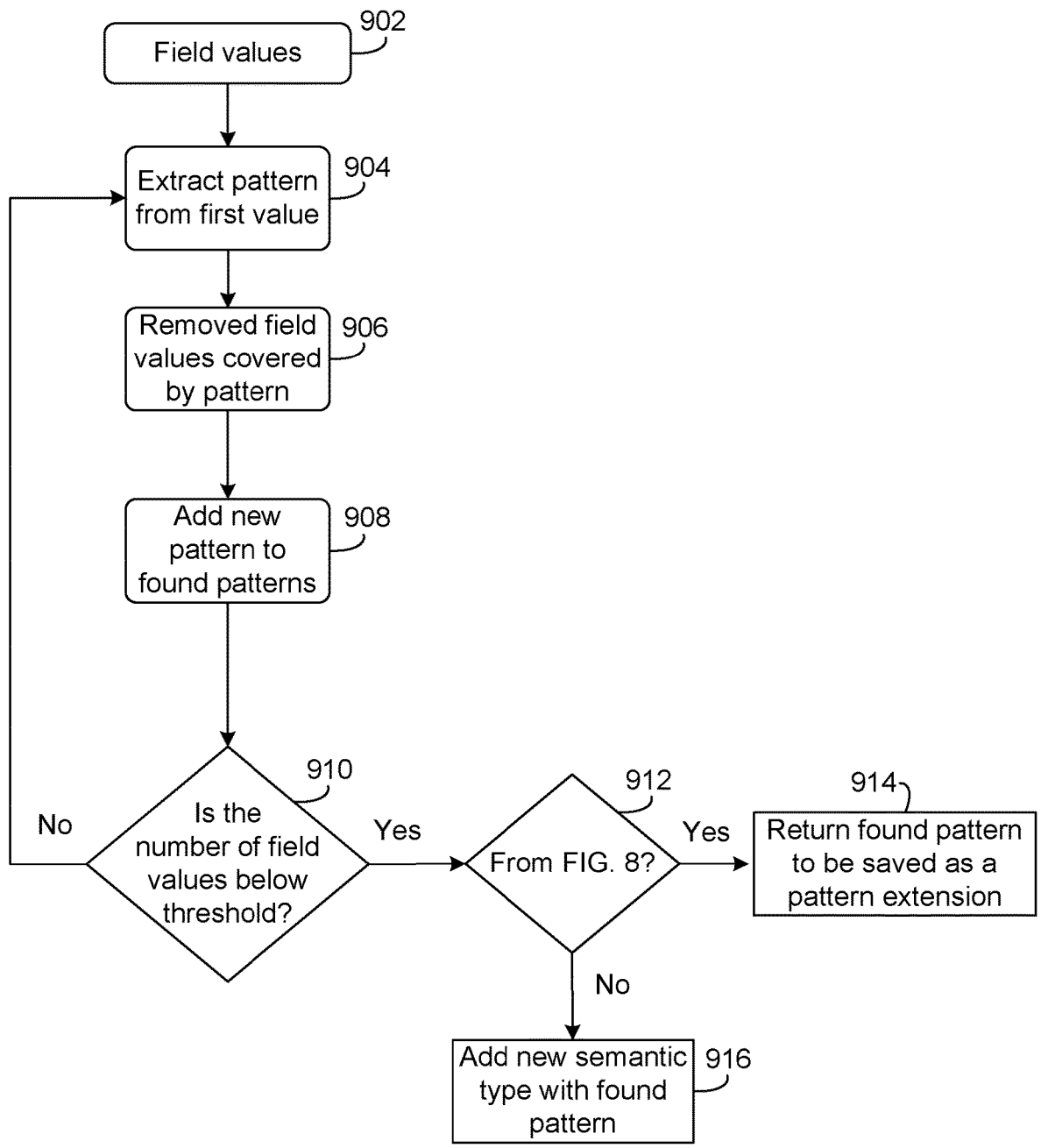
FIG. 9 is a flowchart illustrating a third stage of the five stage process of FIG. 6.

The above loop may iterate over available patterns, and if the resulting pattern result table 810 has not values (812), then the stage fails (814) and operations may proceed to a subsequent stage, as illustrated and described with respect to FIG. 9. Otherwise if the pattern result table 810 is populated (812), then the field value pattern with a maximum match percentage may be chosen (816). In case of a tied (or sufficiently similar) percentage, then the semantic type having the highest priority value in the semantic dictionary 602 may be chosen (818).

As described above with respect to FIG. 5 and the example of the Addr field name of the column 506, a pattern may be matched to a semantic type having an existing pattern that may be extended (if not designated as being a fixed pattern), and a corresponding field name may be added to known field names of an updated semantic dictionary. Similarly, in FIG. 8, if a relevant pattern is not a fixed pattern (820), then the pattern may be extended to encompass otherwise-unmatched field values, using techniques of a third processing stage detailed below with respect to FIG. 9 (824).

As a result, the semantic type may be considered to be found/updated (826). If the pattern is fixed and not extendable (820), then the semantic may be considered to be found (822).

FIG. 9 is a flowchart illustrating a third stage of the five stage process of FIG. 6. In the example of FIG. 9, field values of a field that was not previously associated with a semantic type as a result of operations of FIG. 7 or 8 are extracted (902).

In the example, a first field value of the field values is used to extract a pattern (904). Then, all field values covered by the extracted pattern are removed (906), and the new, extracted pattern is added to found patterns of the new semantic type being created (908).

If the remaining number of field values is not below a threshold (910), then operations 904-908 may repeat. For example, there may be a requirement that generated patterns cover at least 80% of the field values. Consequently, in FIG. 9, a number of remaining field values must drop below 20% to complete the iterative loop of operations 904-910.

After this occurs, if the pattern is being generated to complete the processing of FIG. 8 as part of a pattern extension (912), then the found pattern(s) may be returned to be included as a pattern extension of the relevant semantic type (914). Otherwise (912), a new semantic type that includes the found pattern(s) may be added to the semantic dictionary (916). For example, as described above, the new semantic type may be provided with the found pattern, the relevant threshold, and a known field name that matches the field name of the field values from which the pattern was extracted.

Figure 10:
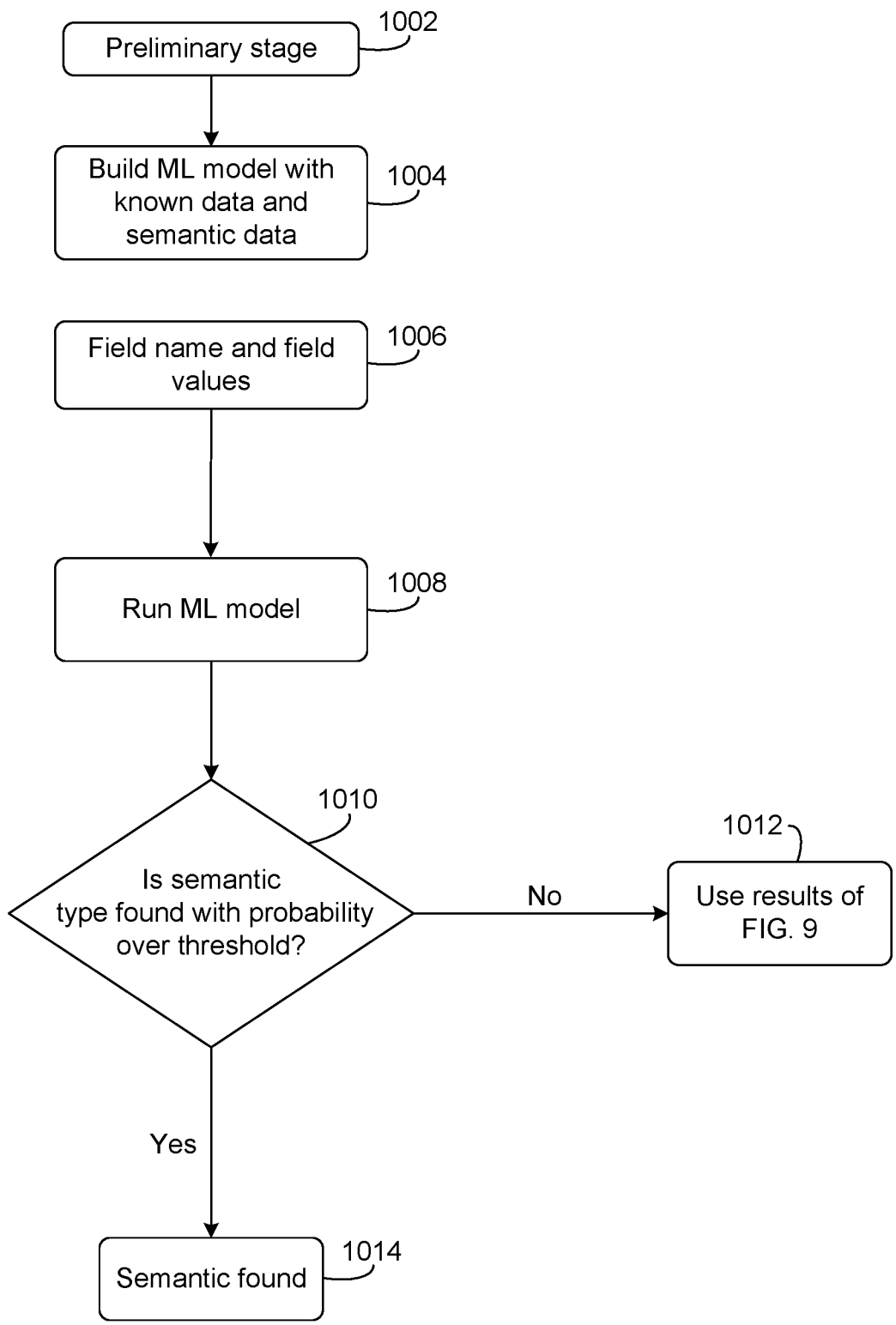
FIG. 10 is a flowchart illustrating a fourth stage of the five stage process of FIG. 6.

FIG. 10 is a flowchart illustrating a fourth stage of the five stage process of FIG. 6. In a preliminary stage (1002), a ML model is built using data with known semantic type (1004). For example, the ML model may use a clustering or other similarity-based model to assign a similarity score to received field name(s)/field value(s), with respect to existing semantic types. For example, the trained ML model may assign a similarity score for each pattern of a plurality of semantic type patterns, with respect to a pattern(s) of field values being tested. A similarity score may also be assigned with respect to a field name of the plurality of semantic types and a field name being tested.

When the processing of FIG. 9 has completed and a new semantic type has been generated, as just described, the processing of FIG. 10 may be used to validate the creation of the new semantic type (as compared, for example, to including the classifying the field values as being included with an existing semantic type). For example, the field name and field values being validated may be extracted (1006), and the trained ML model (e.g., the semantic validation model 134 of FIG. 1) may be executed.

If a semantic type is found that has a probability over a threshold of being a correct semantic type for the field name/field values being validated (1010), then the found semantic (1014) may be associated with the relevant field name/field values, and the previously-generated semantic type produced by the processing of FIG. 9 may be removed. Otherwise (1010), the generated semantic type may be retained (1012).

Figure 11:
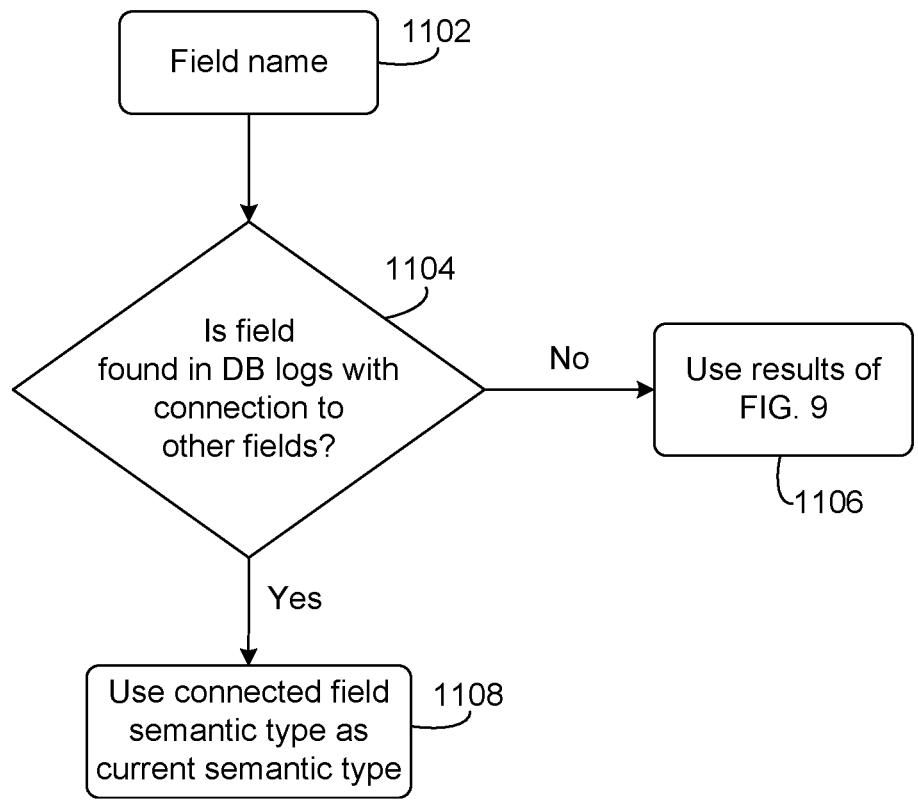
FIG. 11 is a flowchart illustrating a fifth stage of the five stage process of FIG. 6.

FIG. 11 is a flowchart illustrating a fifth stage of the five stage process of FIG. 6. In the example of FIG. 11, a field name being validated is extracted (1102). If the field name is not found in any database (DB) logs in connection with any other field(s) (1104), then the previously-generated semantic type of FIG. 9 may be used (1106). Otherwise (1104), if a connected field is found, then a semantic type of the connected field may be used as a semantic type of the field being validated (1108).

For example, the process of FIG. 11 may include analysis of Structured Query Language (SQL) queries that indicated that two fields have the same semantic type, such as an ON clause in a SQL JOIN. As described, knowledge that a semantic type is known for one field of such a query may enable an inference that the same semantic type should be used for the other field(s) of the query. Either or both of FIG. 10 and/or FIG. 11 may be used to validate results of the processing of FIG. 8.

More generally, the processing of FIG. 6 may proceed through the processing of FIGS. 7-11 as five cascaded steps or stages, in which processing stops at any step/stage based on a certainty score determined as the end of that step/stage. If more than one semantic type if found, a highest-included priority score may be used to make the selection. The semantic type may be selected automatically or offered to a user for review.

Conventional techniques may rely on matching-based approaches such as manually setting dictionary lookups or analysing data flow local to the specific data being processed. Such techniques are not automatic or dynamic in nature, do not scale well, and are not robust to real world data (which may contain malformed field values or empty field values).

In contrast, described techniques use field level matching based on semantic data classification, including using generated regular expressions or patterns to classify semantic types accurately and dynamically. Field data pattern extraction and unsupervised ML-based matching may be used for semantic data classification. For example, a previously-unknown field may be determined to be a license plate number, phone number, social security number, customer identifier, or other unique identifier.

Both field names and field values may be used to provide more accurate results than obtained by solutions that use only one or the other. Consequently, data merge errors may be detected (e.g., erroneous merging of a license plate number into a phone number field).

Described techniques do not require domain expertise, and are operational across multiple domains, such as, e.g., ad-tech, healthcare, or finance. Described techniques may work across different database vendors, and with multiple types of systems and datasets (e.g., data that is tabular, structured, semi-structured (e.g., JSON), or non-structured (e.g., text)).

Described techniques are faster than existing methods while using fewer resources, because, e.g., the described techniques will stop early in a multi-stage (e.g., 5 stage) process once a semantic type is found with a sufficiently high level of confidence. Moreover, the learning ability of described techniques enable faster semantic type detection over time, because a semantic type determined in a later stage during a first processing may be determined in an earlier stage during a subsequent processing. For example, if an organization uses a field name USR_ID for social security numbers, an initial processing may move to stage 2 or stage 3 to recognize the correct semantic type, but a subsequent processing will recognize the semantic type correctly at stage 1.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    receive data having a plurality of field names, each field name associated with a plurality of field values;
    access a semantic dictionary that associates each semantic type of a plurality of semantic types with a field value pattern and at least one known field name;
    relate, for a selected field name of the plurality of field names, corresponding field values to each field value pattern of the semantic dictionary to determine whether the corresponding field values match any field value pattern of the semantic dictionary;
    generate, when the corresponding field values do not match any field value pattern of the semantic dictionary, a candidate field value pattern based on a candidate field value of the corresponding field values;
    determine that a threshold percentage of the corresponding field values conform to the candidate field value pattern; and
    update the semantic dictionary with a new semantic type that is associated with the candidate field value pattern and the selected field name.

2. The computer program product of claim 1, wherein the instructions are further configured to cause the at least one computing device to:
    determine that the selected field name matches a known field name of the at least one known field name, and that the corresponding field values match a field value pattern of the known field name; and
    update the semantic dictionary including associating a semantic type of the plurality of semantic types associated with the known field name and the field value pattern with the selected field name.

3. The computer program product of claim 2, wherein the instructions are further configured to cause the at least one computing device to:
    determine that the selected field name matches the known field name by executing an unsupervised, similarity-based machine learning model.

4. The computer program product of claim 1, wherein the instructions are further configured to cause the at least one computing device to:
    determine that the selected field name does not match a known field name of the at least one known field name, and that the threshold percentage of the corresponding field values match a field value pattern of the semantic dictionary; and
    associate a semantic type associated with the field value pattern within the semantic dictionary with the selected field name.

5. The computer program product of claim 4, wherein the instructions are further configured to cause the at least one computing device to:
    add the selected field name to known field names of the semantic type associated with the field value pattern, within the semantic dictionary.

6. The computer program product of claim 4, wherein the instructions are further configured to cause the at least one computing device to:
    generate, using a subset of the corresponding field values that do not match the field value pattern, a new field value pattern; and
    update the semantic type with the new field value pattern.

7. The computer program product of claim 1, wherein the instructions are further configured to cause the at least one computing device to:
    generate, when the corresponding field values do not match any field value pattern of the semantic dictionary, a second candidate field value pattern based on a second candidate field value of the corresponding field values;
    determine that the threshold percentage of the corresponding field values conform to the candidate field value pattern or the second candidate field value pattern; and
    update the semantic dictionary with the new semantic type that is associated with the candidate field value pattern, the second candidate field value pattern, and the selected field name.

8. The computer program product of claim 7, wherein the instructions are further configured to cause the at least one computing device to:
    associate the selected field name as a known field name of the new semantic type within the semantic dictionary.

9. The computer program product of claim 1, wherein the instructions are further configured to cause the at least one computing device to:
    execute a trained machine learning model to compare the new semantic type to the plurality of semantic types; and
    determine that a similarity of the new semantic type is below a similarity threshold with respect to each of the plurality of semantic types to thereby validate inclusion of the new semantic type within the semantic dictionary.

10. The computer program product of claim 1, wherein the instructions are further configured to cause the at least one computing device to:
    access data logs to identify, for the selected field name, a connected field; and
    determine that a semantic type of the connected field does not match the new semantic field to thereby validate inclusion of the new semantic type within the semantic dictionary.

11. A computer-implemented method, the method comprising:

receiving data having a plurality of field names, each field name associated with a plurality of field values;

accessing a semantic dictionary that associates each semantic type of a plurality of semantic types with a field value pattern and at least one known field name;

relating, for a selected field name of the plurality of field names, corresponding field values to each field value pattern of the semantic dictionary to determine whether the corresponding field values match any field value pattern of the semantic dictionary;

generating, when the corresponding field values do not match any field value pattern of the semantic dictionary, a candidate field value pattern based on a candidate field value of the corresponding field values;

determining that a threshold percentage of the corresponding field values conform to the candidate field value pattern; and updating the semantic dictionary with a new semantic type that is associated with the candidate field value pattern and the selected field name.

12. The method of claim 11, comprising:

determining that the selected field name matches a known field name of the at least one known field name, and that the corresponding field values match a field value pattern of the known field name; and updating the semantic dictionary including associating a semantic type of the plurality of semantic types associated with the known field name and the field value pattern with the selected field name.

13. The method of claim 11, comprising:

determining that the selected field name does not match a known field name of the at least one known field name, and that the threshold percentage of the corresponding field values match a field value pattern of the semantic dictionary; and associating a semantic type associated with the field value pattern within the semantic dictionary with the selected field name.

14. The method of claim 11, comprising:

executing a trained machine learning model to compare the new semantic type to the plurality of semantic types; and determining that a similarity of the new semantic type is below a similarity threshold with respect to each of the plurality of semantic types to thereby validate inclusion of the new semantic type within the semantic dictionary.

15. The method of claim 11, comprising:

accessing data logs to identify, for the selected field name, a connected field; and determining that a semantic type of the connected field does not match the new semantic field to thereby validate inclusion of the new semantic type within the semantic dictionary.

16. A system comprising:

at least one memory including instructions; and at least one processor that is operably coupled to the at least one memory and that is arranged and configured to execute instructions that, when executed, cause the at least one processor to receive data having a plurality of field names, each field name associated with a plurality of field values;

access a semantic dictionary that associates each semantic type of a plurality of semantic types with a field value pattern and at least one known field name;

relate, for a selected field name of the plurality of field names, corresponding field values to each field value pattern of the semantic dictionary to determine whether the corresponding field values match any field value pattern of the semantic dictionary;

generate, when the corresponding field values do not match any field value pattern of the semantic dictionary, a candidate field value pattern based on a candidate field value of the corresponding field values;

determine that a threshold percentage of the corresponding field values conform to the candidate field value pattern; and update the semantic dictionary with a new semantic type that is associated with the candidate field value pattern and the selected field name.

17. The system of claim 16, wherein the instructions are further configured to cause the at least one processor to:

determine that the selected field name matches a known field name of the at least one known field name, and that the corresponding field values match a field value pattern of the known field name; and update the semantic dictionary including associating a semantic type of the plurality of semantic types associated with the known field name and the field value pattern with the selected field name.

18. The system of claim 16, wherein the instructions are further configured to cause the at least one processor to:

determine that the selected field name does not match a known field name of the at least one known field name, and that the threshold percentage of the corresponding field values match a field value pattern of the semantic dictionary; and associate a semantic type associated with the field value pattern within the semantic dictionary with the selected field name.

19. The system of claim 16, wherein the instructions are further configured to cause the at least one processor to:

execute a trained machine learning model to compare the new semantic type to the plurality of semantic types; and determine that a similarity of the new semantic type is below a similarity threshold with respect to each of the plurality of semantic types to thereby validate inclusion of the new semantic type within the semantic dictionary.

20. The system of claim 16, wherein the instructions are further configured to cause the at least one processor to:

access data logs to identify, for the selected field name, a connected field; and determine that a semantic type of the connected field matches the new semantic field to thereby validate inclusion of the new semantic type within the semantic dictionary.

* * * * *